United States Patent Office 2,723,198
Patented Nov. 8, 1955

2,723,198

ANTIBIOTIC FEED SUPPLEMENT

Joseph M. Pensack, Terre Haute, Ind., assignor to Commercial Solvents Corporation, Terre Haute, Ind., a corporation of Maryland No Drawing. Application December 26, 1952,
Serial No. 328,127

3 Claims. (Cl. 99—2)

My invention relates to a feed supplement for livestock and more particularly it relates to a feed supplement containing the antibiotic bacitracin and the penicillin salt of N-methyl-(2-hydroxy-1,2-diphenylethyl)amine.

For some years there has been extensive study of the need for various nutrients in feed for poultry and livestock. This study has resulted in the evolution of feeds compounded to include all of the ingredients necessary to provide the proper proportions of materials such as, for example, proteins, carbohydrates, minerals, vitamins, etc. as well as the formulation of rations designed for specific feeding purposes. Following the development of rations balanced in essential nutrients, it was found that other substances could be included in the ration which would serve as growth promoters and increase the rate at which livestock developed resulting in a larger animal at an earlier age. Growth promoters commonly employed by feed manufacturers include vitamin $B_{12}$, animal protein factor, commonly referred to as "APF," etc. Quite recently it has been found that the inclusion of certain antibiotics such as bacitracin, penicillin, terramycin or aureomycin in feed supplements acts to give an additional growth promoting effect and aids in producing larger animals at an earlier age than can be done with feeds containing only the vitamin $B_{12}$ or APF as supplements.

Employment of a balanced ration, the inclusion in feeds of a supplement-containing material such as vitamin $B_{12}$, and the use of antibiotic feed supplements has achieved widespread use in efforts to produce larger animals in a shorter time in a manner economically justifiable. Many feed supplements containing vitamins, APF, antibiotics, etc. alone or in combination are commercially available and widely employed to accomplish the purposes mentioned above.

I have now discovered a new growth-promoting feed supplement of superior efficiency in its growth-promoting effect, the use of which enables the production of larger animals in a shorter time than heretofore ever achieved. My new feed supplement is economical, efficacious, and readily available for supplying livestock producers.

My new invention is a feed supplement containing as its essential active ingredients the antibiotic bacitracin and the penicillin salt of N-methyl-(2-hydroxy-1,2-diphenylethyl)amine. The essential active ingredients of my new composition can be mixed with diluents which can or cannot have nutritive value and which can or cannot be inert as far as growth-promoting effect is concerned.

The antibiotic bacitracin which is an essential active ingredient of my new feed supplement is readily produced by the method of Grant D. Darker as described in U. S. Patent 2,567,698 on "Production of Bacitracin." The antibiotic can be employed in purified form as obtained by any of the methods of Charney in U. S. Patent 2,582,921 Regna in U. S. Patent 2,556,375, or Goorley in U. S. Patent 2,457,887 or the bacitracin can be employed as a dried fermentation residue from the cultivation of a bacitracin-producing strain of the organism Bacillus subtilis, on a nutrient medium. The penicillin salt of N-methyl-(2-hydroxy-1,2-diphenylethyl)amine, also an essential active ingredient of my new feed supplement, can be produced by any convenient means, however, I prefer to prepare this penicillin salt by mixing a water-soluble penicillin salt such as potassium penicillin in aqueous solution with N-methyl-(2-hydroxy-1,2-diphenylethyl)-amine hydrochloride in aqueous solution and allowing them to react. The penicillin salt of N-methyl-(2-hydroxy-1,2-diphenylethyl)amine which precipitates from the aqueous solution is recovered therefrom by filtration and drying. N-methyl-(2-hydroxy-1,2-diphenylethyl)amine may be prepared by the reductive ammination of benzoin and upon reaction with hydrochloric acid yields the hydrochloride employed in the reaction with penicillin to produce the penicillin salt.

If the penicillin salt of N-methyl-(2-hydroxy-1,2-diphenylethyl)amine is employed with purified bacitracin I employ a nutrient diluent with the antibiotic materials incorporated therein to facilitate mixing the feed supplement in a finished feed. Some of such diluents which can be used include ordinary feed ingredients such as soy flour, finely ground wheat middlings, corn meal, etc. and the dried fermentation residue of a culture of Clostridium acetobutylicum in nutrient media which has been finely ground after drying. Other growth-promoting materials such as for example vitamin $B_{12}$, APF, etc. may be incorporated in the nutrient diluent with the bacitracin and penicillin salt of N-methyl-(2-hydroxy-1,2-diphenylethyl)-amine. When the penicillin salt is employed with the dried fermentation residue of a culture of Bacillus subtilis, no additional nutrient diluent is necessary to facilitate subsequent mixing of the feed supplement in a finished feed, however I prefer to employ a nutrient diluent in order to standardize the bacitracin content of the supplement. Additional nutrient materials also can be added to the mixture to improve the nutritional quality of the supplement and, in particular, materials which I prefer to add include those having a growth-promoting effect such as for example vitamin $B_{12}$, APF, etc.

The amounts of bacitracin and penicillin salt of N-methyl-(2-hydroxy-1,2-diphenylethyl)amine which I can employ in my new feed supplement vary within a wide range. Large amounts on the order of 50 gm. of bacitracin or the penicillin salt per ton of finished feed give excellent responses as far as growth promotion is concerned but the response per gram of antibiotic is considerably less than the response when a smaller amount of antibiotic is employed. Very small amounts of total antibiotic in the feed supplement such as in the nature of 0.5 gm. of bacitracin or penicillin salt of N-methyl-(2-hydroxy-1,2-diphenylethyl)amine give excellent growth response per gram of antbotic but the total growth promotion achieved per animal is more when higher amounts of total antibiotic are employed. I prefer to prepare my new feed supplement so that it contains a 5 to 1 weight ratio of bacitracin to penicillin salt and then employ the supplement in such amounts as to provide about 5 gm. of bacitracin and 1 gm. of the penicillin salt of N-methyl-(2-hydroxy-1,2-diphenylethyl)amine per ton of finished feed.

Parallel hog feeding tests were conducted wherein the same basal ration supplemented with different antibiotic feed supplements was employed. The basal ration used is shown in Table I.

Table I

| Ingredient | Basal Ration | Percent by Weight |
|---|---|---|
| Ground Yellow Corn | | 78.5 |
| Soybean oil meal | | 15.4 |
| Meat and bone scraps | | 2.5 |
| Calcium carbonate | | 0.6 |
| Steamed bone meal | | 1.4 |
| Salt, iodized | | 0.5 |
| Trace minerals | | 0.1 |
| Vitamins | | 1.0 |
| Riboflavin | 1.0 mg./lb | |
| Calcium pantothenate | 2.0 mg./lb | |
| Choline chloride | 50.0 mg./lb | |
| Niacin | 8.0 mg./lb | |
| Vitamin $D_2$ | 400.0 I. U./lb | |

In the hog feeding tests one lot of hogs was fed the basal ration alone while six lots of hogs were fed the basal ration to which was added various supplements including bacitracin in combination with vitamin $B_{12}$, the penicillin salt of N-methyl-(2-hydroxy-1,2-diphenylethyl)amine in combination with vitamin $B_{12}$, a supplement containing both bacitracin and the penicillin salt of N-methyl-(2-hydroxy-1,2-diphenylethyl)amine and a supplement containing bacitracin, the penicillin salt of N-methyl-(2-hydroxy-1,2-diphenylethyl)amine and vitamin $B_{12}$. The hogs were carried to a final weight of 200 lbs. The average daily gain in pounds per hog is shown in Table II, the amount of feed supplements shown in the table being the amount added per pound of basal ration. The notation P-92 in the table stands for the penicillin salt of N-methyl-(2-hydroxy-1,2-diphenylethyl)amine.

Table II

| Lot No. | Treatment | Av. Daily Gain, lbs. |
|---|---|---|
| A | Basal | 1.504 |
| B | Basal+5 mg. Basitracin+3 mcg. $B_{12}$ | 1.560 |
| C | Basal+10 mg. Bacitracin+3 mcg. $B_{12}$ | 1.578 |
| D | Basal+0.5 mg. P-92+3 mcg. $B_{12}$ | 1.54 |
| E | Basal+1 mg. P-92+3 mcg. $B_{12}$ | 1.551 |
| F | Basal+2.5 mg. Bacitracin+0.5 mg. P-92+3 mcg. $B_{12}$ | 1.773 |
| G | Basal+2.5 mg. Bacitracin+0.5 mg. P-92 | 1.73 |

In the use of antibiotics in nutrition, it is generally felt that 5 mg. of bacitracin per pound of feed is the equivalent of 1 mg. of pencillin per pound of feed insofar as growth-promoting effect is concerned. In the above Table II, it can be seen that 5 mg. of bacitracin gave an average daily gain of 1.56 pounds while 1 mg. of the penicillin salt of N - methyl-(2-hydroxy-1,2 - diphenyl)-amine gave an average daily gain of 1.551 pounds. In view of the equivalency of bacitracin and the penicillin salt of N - methyl-(2-hydroxy-1,2-diphenylethyl)amine it would be expected that 5 mg. of bacitracin and 1 mg. of the penicillin salt of N-methyl-(2-hydroxy-1,2-diphenylethyl)amine combined in a pound of feed would be equivalent to feeding 10 mg. of bacitracin per pound of feed. Referring again to the table above it can be seen that 10 mg. of bacitracin when added to the basal ration gave an average daily gain of 1.578 pounds. However, when only 2.5 mg. of bacitracin were combined with only 0.5 mg. of the penicillin salt of N - methyl - (2 - hydroxy - 1,2-diphenylethyl)amine, the amounts being per pound of basal ration, an average daily gain of 1.773 pounds was obtained. Even without the vitamin $B_{12}$, the feed supplement containing a combination of bacitracin and the penicillin salt of N - methyl -(2-hydroxy-1,2-diphenylethyl)-amine gave an average daily gain of 1.73 pounds. The average daily gain obtained with my new feed supplement which contains bacitracin and the penicillin salt of N - methyl - (2 - hydroxy - 1,2-diphenylethyl)amine is far above the average daily gain obtained with either antibiotic alone and is far above the average daily gain expected of the combination.

I prefer to prepare my new feed supplement by diluting whole dried fermentation residue from the culture of a bacitracin-producing strain of the organism B. subtilis, which generally contains in excess of 10 gm. of bacitracin per pound, with a nutrient such as soybean oil meal to obtain a product containing 10 gm. of bacitracin per pound after which I add 2 gm. of the penicillin salt of N - methyl -(2 - hydroxy-1,2-diphenylethyl)amine. When one pound of my feed supplement is added to a ton of feed, the supplement provides 5 mg. of bacitracin and 1 mg. of the penicillin salt of N-methyl-(2-hydroxy-1,2-diphenylethyl)amine per pound of feed.

Many equivalents of my new invention will be apparent to those skilled in the art and I intend for all such equivalents to be included within the scope of this specification and the attached claims.

What I claim is:

1. An antibiotic feed supplement comprising bacitracin, the penicillin salt of N-methyl-(2-hydroxy-1,2-diphenylethyl)-amine and a nutrient diluent therefor.

2. An antibiotic feed supplement comprising the dried fermentation residue of a culture of a bacitracin-producing strain of Bacillus subtilis in nutrient liquid media and the penicillin salt of N - methyl - (2 - hydroxy-1,2-diphenylethyl)amine.

3. A livestock feed comprising a nutrient feed mixed with the antibotic bacitracin and the penicillin salt of N-methyl-(2-hydroxy-1,2-diphenylethyl)amine.

References Cited in the file of this patent

UNITED STATES PATENTS

| 2,588,517 | Granatek | Mar. 11, 1952 |
| 2,645,638 | Young | July 14, 1953 |

OTHER REFERENCES

Richardson, et al.: J. Nutrition, 44:371 (1951).

Matterson, et al.: Bulletin 275 (March 1951), Storrs Agr. Ex. Sta., Univ. of Conn., pp. 5 and 11.

Drug and Cos. Ind., (May 1951), 68:5, p. 641.